United States Patent
Buzi (10) Patent No.: US 9,841,971 B1
(45) Date of Patent: Dec. 12, 2017

(54) EMBEDDING SOFTWARE UPDATES INTO CONTENT RETRIEVED BY APPLICATIONS

(71) Applicant: INTUIT INC., Mountain View, CA (US)

(72) Inventor: Larry Y. Buzi, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 14/644,330

(22) Filed: Mar. 11, 2015

(51) Int. Cl.
*G06F 9/45* (2006.01)
*G06F 9/445* (2006.01)
*G06F 9/54* (2006.01)

(52) U.S. Cl.
CPC ............ *G06F 8/67* (2013.01); *G06F 9/547* (2013.01)

(58) Field of Classification Search
CPC ........................................ G06F 8/67
See application file for complete search history.

(56) References Cited

U.S. PATENT DOCUMENTS

| | | | |
|---|---|---|---|
| 6,154,878 A * | 11/2000 | Saboff | G06F 8/67 707/999.202 |
| 6,185,734 B1 * | 2/2001 | Saboff | G06F 8/67 707/999.202 |
| 6,199,203 B1 * | 3/2001 | Saboff | G06F 8/67 711/100 |
| 7,003,767 B2 * | 2/2006 | Larkin | G06F 8/65 717/169 |
| 8,578,361 B2 * | 11/2013 | Cassapakis | G06F 8/665 717/168 |
| 9,075,692 B2 * | 7/2015 | Yu | G06F 8/67 |
| 2002/0129129 A1 * | 9/2002 | Bloch | G06F 8/61 709/220 |
| 2002/0165961 A1 * | 11/2002 | Everdell | G06F 21/604 709/225 |
| 2005/0096025 A1 * | 5/2005 | Qumei | G06F 8/65 455/418 |
| 2005/0149922 A1 * | 7/2005 | Vincent | G06F 8/67 717/172 |
| 2008/0201457 A1 * | 8/2008 | London | H04L 29/06 709/222 |
| 2008/0256528 A1 * | 10/2008 | Waitzmann | G06F 8/67 717/172 |
| 2010/0281475 A1 * | 11/2010 | Jain | G06F 8/68 717/172 |
| 2010/0318982 A1 * | 12/2010 | Lumley | G06F 17/24 717/168 |
| 2011/0035740 A1 * | 2/2011 | Powell | G06F 8/65 717/170 |
| 2012/0102476 A1 * | 4/2012 | Yu | G06F 8/67 717/168 |

(Continued)

*Primary Examiner* — Matthew Brophy (57) ABSTRACT

The disclosed embodiments provide a system that facilitates execution of an application that is updated after undergoing an approval process with a digital application distribution platform on an electronic device. During operation, the system obtains content for display within the application from a server. Next, the system identifies, within the content, an update to the application. The system then modifies execution of the application during runtime of the application by applying the update without reloading the application on the electronic device and without downloading the update from the digital application distribution platform.

20 Claims, 5 Drawing Sheets

(56) References Cited

U.S. PATENT DOCUMENTS

| | | | |
|---|---|---|---|
| 2013/0254262 A1* | 9/2013 | Udall | H04L 67/42 709/203 |
| 2014/0068595 A1* | 3/2014 | Belinsky | G06F 8/65 717/173 |
| 2014/0109046 A1* | 4/2014 | Hirsch | G06F 9/44 717/120 |
| 2015/0079960 A1* | 3/2015 | Silin | H04W 4/003 455/418 |
| 2015/0128105 A1* | 5/2015 | Sethi | G06F 8/36 717/106 |
| 2015/0128126 A1* | 5/2015 | Brunet | G06F 8/65 717/172 |
| 2015/0301805 A1* | 10/2015 | Batra | G06F 8/31 717/114 |
| 2016/0044091 A1* | 2/2016 | Doumet | H04L 67/10 715/745 |
| 2016/0196135 A1* | 7/2016 | Mavinakayanahalli | G06F 8/67 717/170 |
| 2016/0266889 A1* | 9/2016 | Gross | G06F 8/65 |

* cited by examiner

EMBEDDING SOFTWARE UPDATES INTO CONTENT RETRIEVED BY APPLICATIONS

RELATED APPLICATION

The subject matter of this application is related to the subject matter in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014.

BACKGROUND

Related Art

The disclosed embodiments relate to software updates. More specifically, the disclosed embodiments relate to techniques for embedding software updates into content retrieved by native applications.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

The applications may also be periodically updated. For example, a software update for an application may be released to fix bugs, install new features, improve existing features, and/or change other attributes of the application. The software update may be downloaded as a new version of the application from a server and applied by replacing an old version of the application with the new version. Alternatively, the application may download and install a patch containing the software update. After the patch is installed, the application may restart to allow the patch to take effect.

However, updates to applications on certain platforms may be available only after a delay. For example, a bug fix may be included in a new version of a mobile application. However, the new version may require approval before the new version can be distributed on a digital application distribution platform (e.g., an "app store" or application marketplace). As a result, users may continue to use the outdated or buggy version of the mobile application for a number of days before the new version is approved and published on the digital application distribution platform.

Such delays in providing critical updates to applications may adversely affect the user experience with the application and foster a negative view of the applications' quality, reliability, and/or usability. Consequently, user experiences with applications may be improved by expediting the release of critical software updates for the applications.

SUMMARY

Mobile applications are commonly downloaded from digital application distribution platforms, otherwise known as "app stores" or application marketplaces. Prior to publication on a digital application distribution platform, an application may undergo an approval process with the digital application distribution platform. For example, the application may be examined for reliability, functionality, appropriate content, or other attributes before the application is approved for distribution through an app store.

However, the approval process for publishing mobile applications on digital application distribution platforms may delay access to bug fixes and other critical software updates. For example, a new version of an application that contains a bug fix may not be available for download by users until the new version is approved for distribution through an app store. As a result, the users may continue to use an outdated or buggy version of the application for a number of days until the new version is available.

Conventional techniques for bypassing the approval process for updating an application through a digital application distribution platform include the use of "hybrid" applications that implement most of their functionality using web view components that render embedded web pages within the applications' user interfaces. However, the use of web views in mobile applications may result in limited functionality and performance over those of applications that use native user-interface components.

To bypass such delays without sacrificing native performance and functionality, an update to an application may be included in content that is downloaded from a server by the application. For example, an update to a function in the application may be embedded in content that is displayed within a user interface of the application. The application may identify the update within the content and apply the update by substituting existing source code for the function with new source code included in the update. Because the update is applied during runtime of the application, the update may be implemented more seamlessly than conventional software update mechanisms that require reloading of the application before the updates take effect.

The disclosed embodiments provide a system that facilitates execution of an application that is updated after undergoing an approval process with a digital application distribution platform on an electronic device. During operation, the system obtains content for display within the application from a server. Next, the system identifies, within the content, an update to the application. The system then modifies execution of the application during runtime of the application by applying the update without reloading the application on the electronic device and without downloading the update from the digital application distribution platform.

In some embodiments, the system also displays the content within a user interface of the application. In these embodiments, modifying execution of the application during runtime of the application includes using the update to change the display of the content within the application based on input received from a user of the application.

In some embodiments, identifying the update in the application includes obtaining, from the content, a function name of a function in the application and an encoded string representing the function.

In some embodiments, applying the update includes decoding the encoded string to obtain new source code for the function, and replacing existing source code for the function in the application with the new source code.

In some embodiments, the existing source code is replaced with the new source code using at least one of a function constructor and a function-evaluation mechanism.

In some embodiments, the content is obtained from the server using a web service call to the server.

In some embodiments, the application is a native application, and the update is embedded within the content.

In some embodiments, the content is obtained independently of a platform of the application.

In some embodiments, the content includes at least one of a set of views, a navigation flow associated with the views, a set of data elements in the views, and a data model for the set of data elements.

In some embodiments, the update is used to perform at least one of updating a state of the application, validating data inputted into the application, and formatting the data.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Mobile applications are commonly downloaded from digital application distribution platforms, otherwise known as "app stores" or application marketplaces. Prior to publication on a digital application distribution platform, an application may undergo an approval process with the digital application distribution platform. For example, the application may be examined for reliability, functionality, appropriate content, or other attributes before the application is approved for distribution through an app store.

However, the approval process for publishing mobile applications on digital application distribution platforms may delay access to bug fixes and other critical software updates. For example, a new version of an application that contains a bug fix may not be available for download by users until the new version is approved for distribution through an app store. As a result, the users may continue to use an outdated or buggy version of the application for a number of days until the new version is available.

Conventional techniques for bypassing the approval process for updating an application through a digital application distribution platform include the use of "hybrid" applications that implement most of their functionality using web view components that render embedded web pages within the applications' user interfaces. However, the use of web views in mobile applications may result in limited functionality and performance over those of applications that use native user-interface components.

To bypass such delays without sacrificing native performance and functionality, an update to an application may be included in content that is downloaded from a server by the application. For example, an update to a function in the application may be embedded in a response from the server that contains content for display within a user interface of the application. The application may identify the update within the content and apply the update by substituting existing source code for the function with new source code included in the update. Because the update is applied during runtime of the application, the update may be implemented more seamlessly than conventional software update mechanisms that require reloading of the application before the updates take effect.

Figure 1:
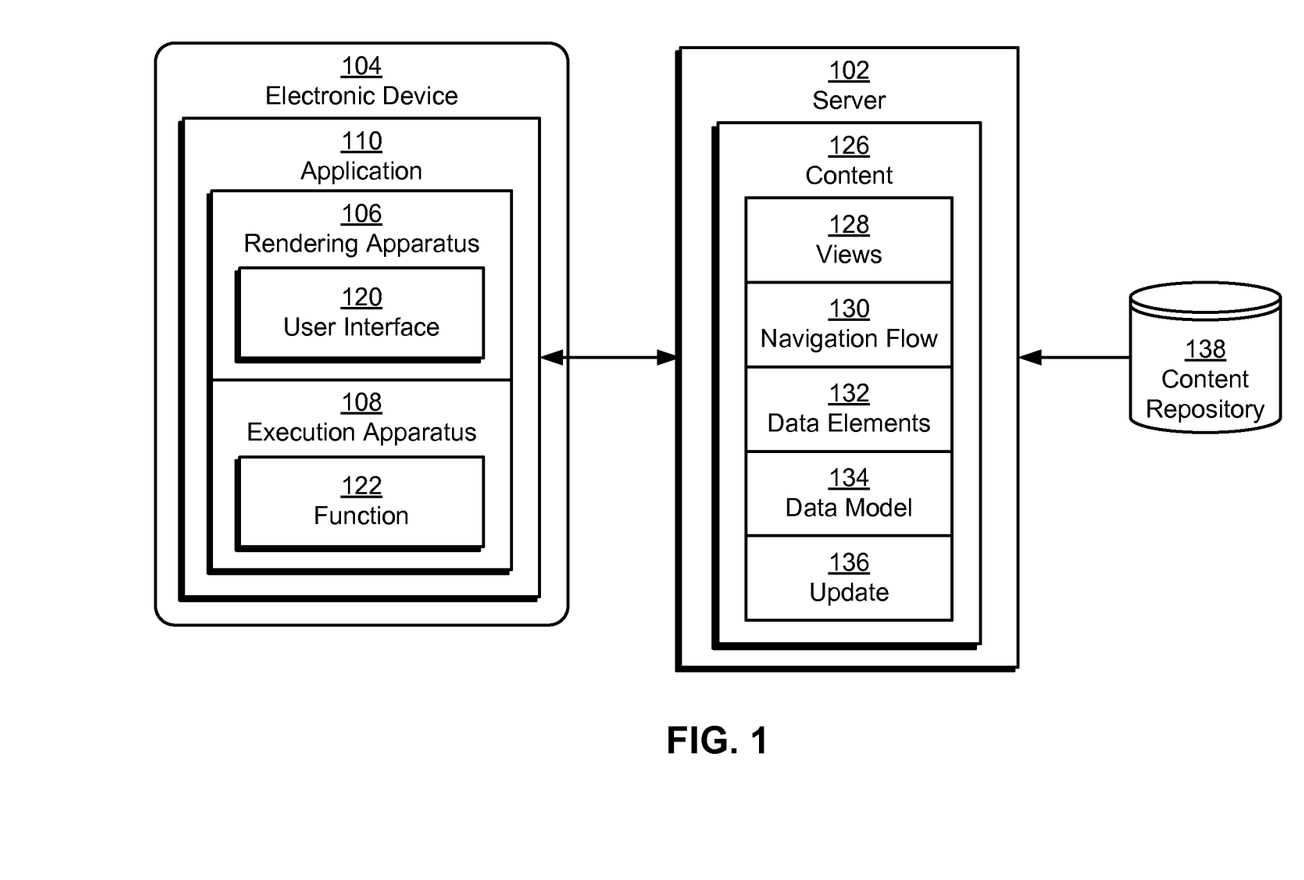
FIG. 1 shows a schematic of a system in accordance with the disclosed embodiments.

The disclosed embodiments provide a method and system for facilitating execution of an application on an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform and/or content provider such as an "app store" or application marketplace and installed locally on electronic device 104. As a result, the implementation of application 110 may be based on the platform (e.g., operating system, hardware, etc.) of electronic device 104.

Application 110 may then be used to perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data and/or content 126 associated with application 110 from a server 102 and transmit data from application 110 to server 102. For example, electronic device 104 may use a wired, wireless and/or cellular network to send and receive emails, financial information, digital media, game play information, and/or other data used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data, buttons, and/or other user-interface elements to the user. The GUI may also accept user input (e.g., gestures, keyboard presses, etc.) that is used to manipulate and/or update the elements. In other words, user interface 120 may be a mechanism for providing and/or formatting data and/or features associated with application 110 for use on electronic device 104.

In one or more embodiments, a rendering apparatus 106 in application 110 generates user interface 120 using content 126 obtained from server 102. Content 126 may be obtained as structured data that includes a set of views 128, a navigation flow 130 associated with views 128, a set of data elements 132, and a data model 134 for data elements 132. For example, content 126 may be provided using one or more Extensible Markup language (XML) documents, JavaScript Object Notation (JSON) objects, and/or other types of structured, platform-agnostic data.

Views 128 may describe the text, images, and/or user-interface elements to be included in screens of user interface 120, with each view representing a different screen of user interface 120. Navigation flow 130 may specify the order in which screens of user interface 120 are to be displayed. For example, navigation flow 130 may include a linear or non-linear flow through screens of user interface 120, which may be based on the state of application 110 and/or user input provided through user interface 120. Data elements 132 may include values of data entered by the user into application 110. For example, content 126 may include names of data elements 132 used by application 110, as well as values of data elements 132 entered by the user and/or obtained from an external source (e.g., tax forms, public records, emails, etc.). Data model 134 may specify data types of data elements 132, such as text, Boolean, enumerated, numeric, date, currency, and/or other data types that may be specific to application 110.

Platform-independent interactive content 126 may then be used by a platform-specific rendering apparatus 106 to provide user interface 120. For example, platform-agnostic JSON objects representing views 128, navigation flow 130, data elements 132, and data model 134 may be used by a natively executing rendering apparatus 106 on one or more desktop or mobile versions of application 110 to display content 126 in user interface 120. In addition, rendering of content 126 within user interface 120 may vary with the platform and/or type of electronic device 104. For example, rendering apparatus 106 may tailor the layout of views 128 in user interface 120 based on the dimensions, orientation (e.g., portrait, landscape, etc.), form factor, and/or input/output (I/O) devices of electronic device 104.

Such decoupling of content 126 from the platform in which content 126 is rendered may allow updates to user interface 120 to be deployed to application 110 without changing the source code used to execute application 110. For example, a designer or developer of application 110 may upload a new version of content 126 to a content repository 138. Once the new version of content 126 is available in content repository 138, server 102 may provide the new version in response to requests for content 126 from application 110, and rendering apparatus 106 may generate user interface 120 based on the new version of content 126 instead of previous versions of content 126. Platform-independent rendering of content (e.g., content 126) in applications (e.g., application 110) is described further in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014, which is incorporated herein by reference.

Content 126 may additionally include an update 136 to a function 122 in application 110. Function 122 may be used by an execution apparatus 108 in application 110 to perform one or more tasks. For example, function 122 may be executed by execution apparatus 108 to update a state of application 110 based on user input to application 110, validate data inputted into application 110 based on the data type of the data, and/or format the inputted data based on the data type.

Like other parts of content 126, update 136 may be used to change the behavior of application 110 without requiring a new installation or version of application 110. Unlike other parts of content 126, update 136 may be used to modify the execution of application 110 instead of the appearance of application 110 during runtime of application 110. More specifically, execution apparatus 108 may include functionality to apply update 136 to function 122 without reloading application 110, as described in further detail below with respect to FIG. 2. For example, execution apparatus 108 may use a function constructor and/or function-evaluation mechanism to dynamically replace existing source code for function 122 in application 110 with new source code from update 136, thus modifying the execution of application 110 without interrupting use of application 110 by the user.

Consequently, the system of FIG. 1 may bypass conventional mechanisms for updating application 110. For example, the delivery of update 136 with content 126 may allow update 136 to be delivered faster than if update 136 were provided through an online application distribution platform for a mobile version of application 110. Similarly, the application of update 136 during runtime of application 110 may improve the user experience over the delivery of update 136 in a software patch, which may require restarting of application 110 after the software patch is applied.

Figure 2:
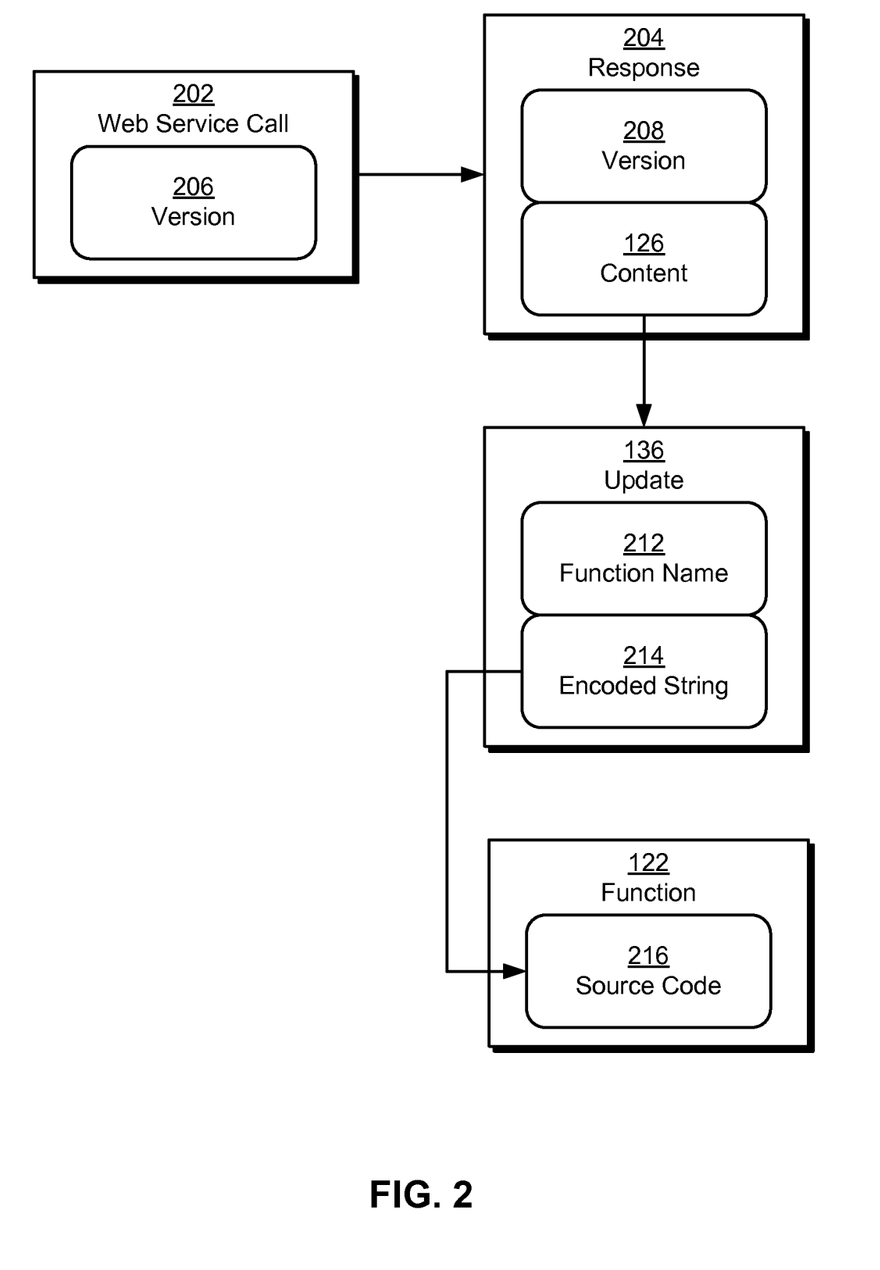
FIG. 2 shows the exemplary updating of a function in an application during runtime of the application in accordance with the disclosed embodiments.

FIG. 2 shows the exemplary updating of function 122 in an application (e.g., application 110 of FIG. 1) during runtime of the application in accordance with the disclosed embodiments. As mentioned above, update 136 to function 122 may be obtained with content 126 for display within the application. To obtain content 126, the application may transmit a web service call 202 such as a representational state transfer (REST) call to a server (e.g., server 102 of FIG. 1). Web service call 202 may include a version 206 of the application, such as a version number associated with the current implementation of the application.

After web service call 202 is received by the server, the server may transmit a response 204 containing content 126 for display in a user interface (e.g., user interface 120 of FIG. 1) of the application. Content 126 may include a set of views, a navigation flow associated with the views, a set of data elements in the views, and/or a data model for the set of data elements. The server may also use version 206 from web service call 202 to determine that update 136 is needed by the application. For example, the server may determine from the version number in web service call 202 that the application is missing a bug fix and/or other functionality.

To expedite the inclusion of bug fixes or additional functionality in the application, the server may include update 136 with content 126 in response 204. The server may also specify a version 208 of the application that is associated with the update 136. For example, the application may specify a version number of 1.1 in web service call 202, which includes a bug associated with validating data inputted into the application by a user. To fix the bug, the server may include the bug fix in update 136, which is transmitted in response 204 with a version number of 1.2 that represents a version of the application that no longer has the bug.

After receiving response 204, the application may identify update 136 by obtaining a function name 212 of function 122 and an encoded string 214 representing function 122 from content 126. The application may then decode encoded string 214 to obtain new source code for function 122 and use the new source code to replace existing source code 216 in function 122 during runtime of the application.

For example, content 126 may include the following JSON representation:
{
  "id": "appUI",
  "topic": "TTO",
  "context": { }
  "updates": {
    "data.getDataVal":
      "JTdCJTIwcmV0dXJuJTIwJTIyNTU1JTIyJ-
        TNCJTIwJTdE",
    "getVersion":
      "cmV0dXJuJTI1MjAlMjUyN3BhdGNoXz-
        EyMyUyNTI3"
  },
  "views": [
    {"id": "form_1_part1" ... },
    {"id": "form_1_part2" ... },
    {"id": "form_1_part3" ... },
    {"id": "summary1" ... },
  ]
  "schema": { ... }
  "data": { ... }
  "navigation": {"BEGIN": "form_1flow" ... }
}

The JSON representation may include a unique identifier (e.g., "id") of "appUI" and a topic (e.g., "topic") of "TTO" for content 126. The JSON representation may also include a "views" section that describes a set of views to be included in the user interface, including views named "form_1_part1," "form_1_part2," "form_1_part3," and "summary1." The JSON representation further includes a "schema" section describing the data types of data elements in the user interface, a "data" section containing data to be included in the data elements, and a "navigation" section that specifies a navigation flow across the screens.

Update 136 may be found in an "updates" section of the JSON representation. In particular, the "updates" section includes two function names, "data.getDataVal" and "getVersion", followed by Base64-encoded strings of source code for two functions represented by the function names, respectively. The encoding of the source code may convert characters that are not valid in JSON string types, such as quotation marks, into valid characters such as Base64 characters.

To apply update 136, the encoded strings may be decoded to obtain source code that returns the value of "555" for the "data.getDataVal" function and source code that returns the value of "patch_123" for the "getVersion" function. The source code may then be used in lieu of existing source code 216 during runtime of the application using a function constructor, function-evaluation mechanism, and/or other mechanism for creating or executing a function from a string.

For example, one or more parts of the application may be executed using a JavaScript engine that renders content 126 for the user interface natively instead of displaying a series of web pages within a web view. To replace source code 216 in function 122 with source code from update 136, a variable named "downloadedString" may be set to the encoded string representing function 122, and a JavaScript function constructor may be used to substitute source code 216 with a newer version from update 136:
  var source=Base64decode(downloadedString);
  util.toBeReplaced=new Function(source)
By calling the function constructor, the code base of the application may be modified at runtime using update 136, thus allowing update 136 to be applied without installing a software patch or newer version of the application and/or reloading the application.

Update 136 may also be used with non-native applications such as web applications. For example, a web application may use JavaScript to render one or more web pages within a web browser. If a JavaScript function in the web application is changed, an updated version of the function may be provided with content to be displayed in the web pages. The web application may then use a JavaScript function constructor and/or "eval" function to substitute an outdated version of the function with the updated version without refreshing the web pages on which the function is used. In contrast, conventional mechanisms for updating source code in a web application may require refreshing of the web page in which the web application executes, which may interrupt use of the web application for a number of seconds as the source code is downloaded over a network connection with the website on which the web application is hosted.

After update 136 is applied, the application may use the new version 208 associated with update 136 in subsequent communications with the server. Continuing with the above example, update 136 to the "getVersion" function may replace version 206 included in web service call 202 with the value of "patch_123." During subsequent requests for content 126 and/or other data from the server, the application may include "patch_123" as the current version 206 of the application, thus indicating to the server that update 136 has already been applied. Update 136 may also remain in effect until the application is shut down. The next time the application is initialized, the application may receive the same update 136 from the server unless the application has already been updated to a newer version (e.g., version 208) that includes update 136.

Figure 3:
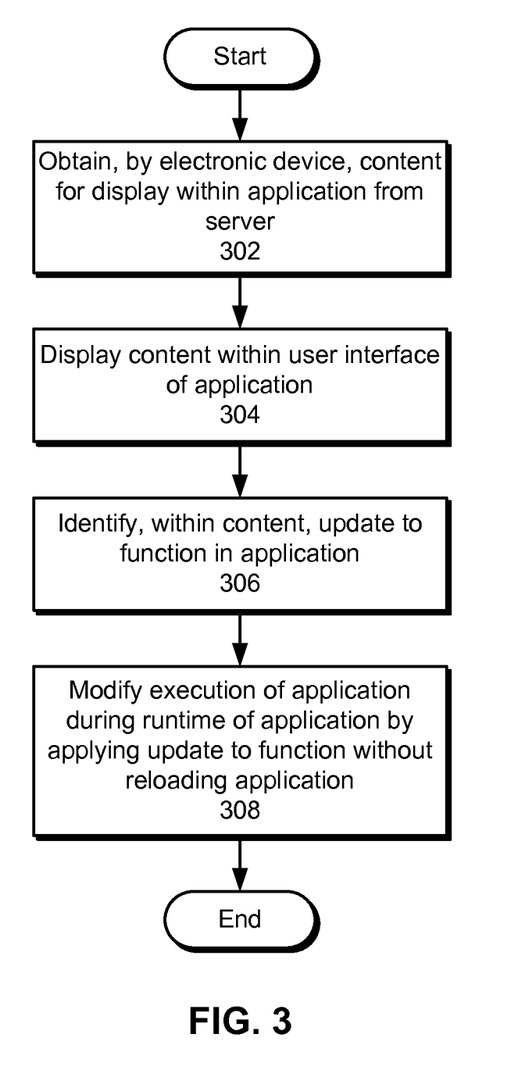
FIG. 3 shows a flowchart illustrating the process of facilitating execution of an application on an electronic device in accordance with the disclosed embodiments.

FIG. 3 shows a flowchart illustrating the process of facilitating execution of an application on an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, content for display within the application is obtained from a server by the electronic device (operation 302). The content may include a set of views, a navigation flow associated with the views, a set of data elements in the views, and/or a data model for the set of data elements. The content may be obtained independently of a platform of the application. For example, the content may be included in one or more XML documents, JSON objects, and/or other platform-agnostic structured data, while the application may be a native application such as a mobile application or desktop application. Next, the content is displayed within a user interface of the application (operation 304). For example, a native JavaScript engine in a mobile version of the application may be used to render the content in one or more screens of the user interface.

An update to a function in the application is identified within the content (operation 306), and execution of the application is modified during runtime of the application by applying the update to the function without reloading the application (operation 308). The update may be used to change the display of the content within the application based on input received from a user of the application. For example, the update may be applied to a function that updates a state of the application and/or validates or formats data inputted into the application (e.g., based on a data type of the data specified in the data model). Applying updates to functions in applications without reloading the applications is described in further detail below with respect to FIG. 4.

Figure 4:
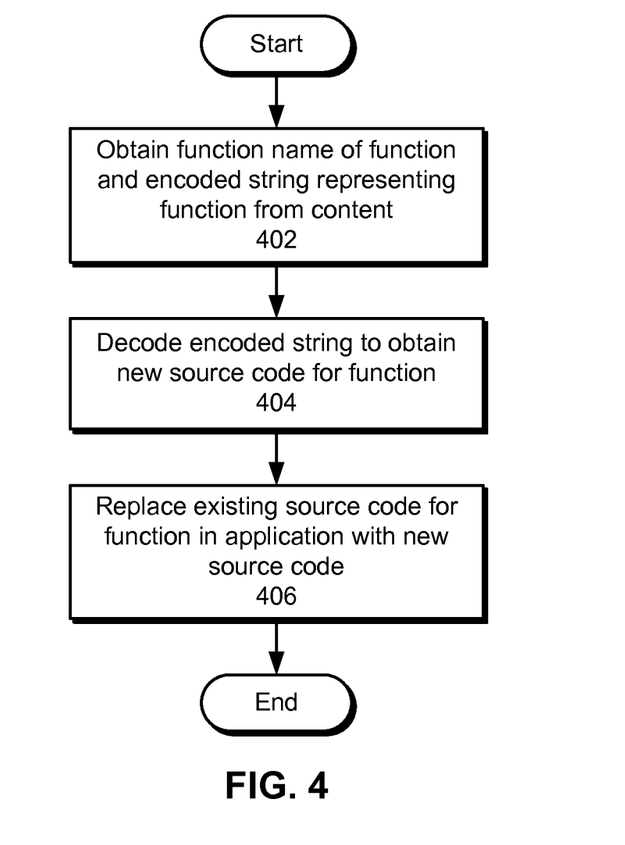
FIG. 4 shows a flowchart illustrating the process of applying an update to a function in an application in accordance with the disclosed embodiments.

FIG. 4 shows a flowchart illustrating the process of applying an update to a function in an application in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a function name of the function and an encoded string representing the function is obtained from content (operation 402) for display within the application. For example, the function name and a Base64-encoded string representing source code for the function may be embedded in a JSON object containing the content. Other encoding techniques, such as percent-encoding and/or Base85 encoding, may also be used to encode the string.

Next, the encoded string is decoded to obtain new source code for the function (operation 404), and existing source code for the function in the application is replaced with the new source code (operation 406). For example, a function constructor or function-evaluation mechanism (e.g., an "eval" function) may be used to replace the existing source code with the new source code during runtime of the application.

Figure 5:
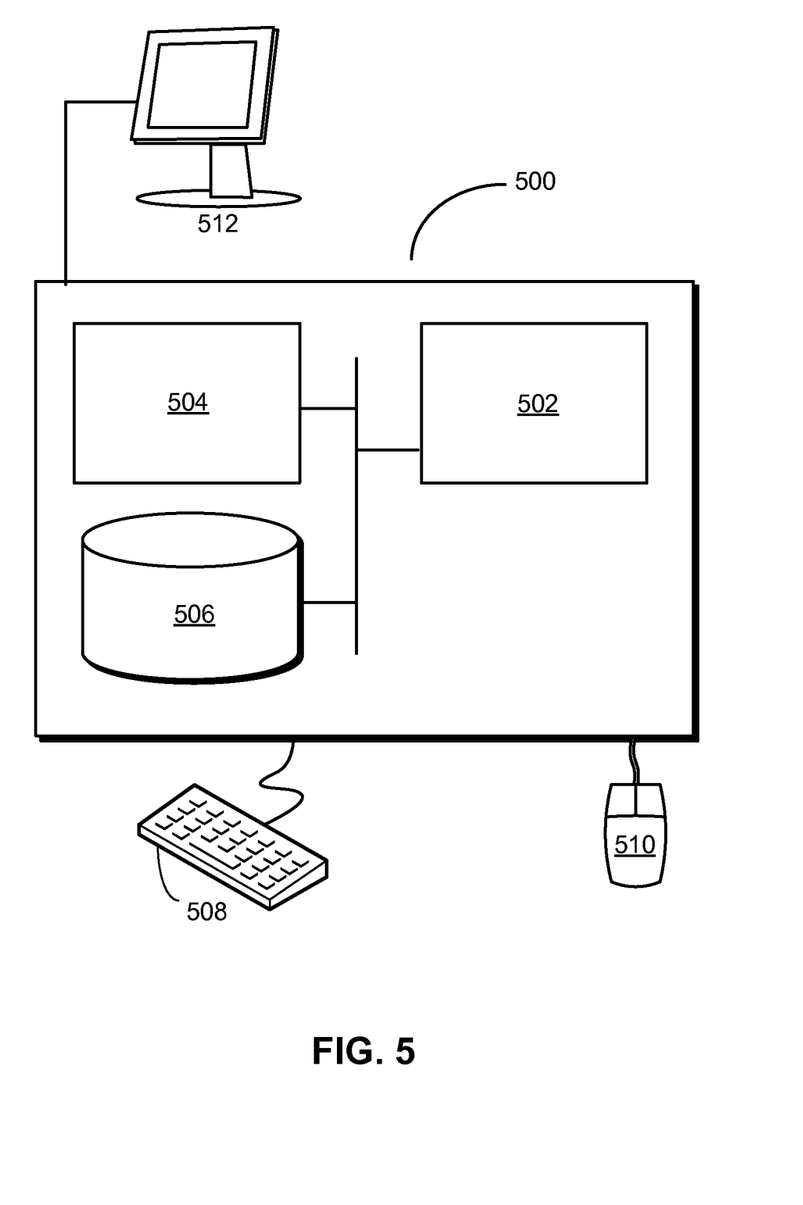
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating execution of an application on an electronic device. The system may include a rendering apparatus that obtains content for display within the application from a server and displays the content within a user interface of the application. The system may also include an execution apparatus that identifies, within the content, an update to a function in the application. The execution apparatus may also modify execution of the application during runtime of the application by applying the update to the function without reloading the application on the electronic device.

In addition, one or more components of computer system 500 may be remotely located and connected to the other components over a network. Portions of the present embodiments (e.g., rendering apparatus, execution apparatus, server, etc.) may also be located on different nodes of a distributed system that implements the embodiments. For example, the present embodiments may be implemented using a cloud computing system that provides content containing embedded updates to an application to a set of remote portable electronic devices on which the application is installed.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating execution of a native application that is updated after undergoing an approval process with a digital application distribution platform on an electronic device, comprising:

obtaining, by the electronic device, a first set of content for display within the native application from a server;

identifying, within the first set of content, an update to the native application;

modifying, on the electronic device, execution of the native application during a first runtime of the native application by applying the update without reloading the native application on the electronic device and without downloading the update from the digital application distribution platform, wherein the update remains in effect in the native application until the first runtime ends, thereby ceasing to be in effect in the native application after the first runtime ends;

obtaining, by the electronic device after the first runtime of the native application ends, a second set of content for display within the native application from the server;

identifying, within the second set of content, the update to the native application; and modifying, on the electronic device, execution of the native application during a second runtime of the native application by applying the update.

2. The method of claim 1, further comprising:
displaying the first set of content within a user interface of the native application,
wherein modifying execution of the native application during the first runtime of the native application comprises using the update to change the display of the first set of content within the native application based on input received from a user of the native application.

3. The method of claim 1, wherein identifying the update to the native application comprises:
obtaining, from the first set of content, a function name of a function in the native application and an encoded string representing the function.

4. The method of claim 3, wherein applying the update comprises:
decoding the encoded string to obtain new source code for the function;
replacing existing source code for the function in the native application with the new source code.

5. The method of claim 4, wherein the existing source code is replaced with the new source code using at least one of:
a function constructor; and
a function-evaluation mechanism.

6. The method of claim 1, wherein the first set of content is obtained from the server using a web service call to the server.

7. The method of claim 1,
wherein the update is embedded within the content.

8. The method of claim 1, wherein the first set of content is obtained independently of a platform of the native application.

9. The method of claim 1, wherein the first set of content comprises at least one of:
a set of views;
a navigation flow associated with the views;
a set of data elements in the views; and
a data model for the set of data elements.

10. The method of claim 1, wherein the update is used to perform at least one of:
updating a state of the native application;
validating data inputted into the native application; and
formatting the data.

11. An apparatus, comprising:
one or more processors; and
memory storing instructions that, when executed by the one or more processors, cause the apparatus to:
obtain a first set of content for display within a native application from a server, wherein the native application is updated after undergoing an approval process with a digital application distribution platform;
identify, within the first set of content, an update to the native application;
modify execution of the native application on the one or more processors during a first runtime of the native application by applying the update without reloading the native application in the memory and without downloading the update from the digital application distribution platform, wherein the update remains in effect in the native application until the first runtime ends, thereby ceasing to be in effect in the native application after the first runtime ends;

obtaining, by the electronic device after the first runtime of the native application ends, a second set of content for display within the native application from the server;
identifying, within the second set of content, the update to the native application; and
modifying, on the electronic device, execution of the native application during a second runtime of the native application by applying the update.

12. The apparatus of claim 11, wherein identifying the update to the native application comprises:
obtaining, from the first set of content, a function name of a function in the native application and an encoded string representing the function.

13. The apparatus of claim 12, wherein applying the update comprises:
decoding the encoded string to obtain new source code for the function; and
replacing existing source code for the function in the native application with the new source code.

14. The apparatus of claim 11,
wherein the update is embedded within the content.

15. The apparatus of claim 11, wherein the first set of content is obtained independently of a platform of the native application.

16. The apparatus of claim 11, wherein the update is used to perform at least one of:
updating a state of the native application;
validating data inputted into the native application; and
formatting the data.

17. A non-transitory computer-readable storage medium storing instructions that when executed by a computer cause the computer to perform a method for facilitating execution of a native application that is updated after undergoing an approval process with a digital application distribution platform on an electronic device, the method comprising:
obtaining a first set of content for display within the native application from a server;
identifying, within the first set of content, an update to the native application;
modifying execution of the native application during a first runtime of the native application by applying the update without reloading the native application on the electronic device and without downloading the update from the digital application distribution platform, wherein the update remains in effect in the native application until the first runtime ends, thereby ceasing to be in effect in the native application after the first runtime ends;
obtaining, by the electronic device after the first runtime of the native application ends, a second set of content for display within the native application from the server;
identifying, within the second set of content, the update to the native application; and
modifying, on the electronic device, execution of the native application during a second runtime of the native application by applying the update.

18. The non-transitory computer-readable storage medium of claim 17, wherein identifying the update to the native application comprises:
obtaining, from the first set of content, a function name of a function in the native application and an encoded string representing the function.

19. The non-transitory computer-readable storage medium of claim 18, wherein applying the update comprises:

decoding the encoded string to obtain new source code for the function; and replacing existing source code for the function in the native application with the new source code.

20. The non-transitory computer-readable storage medium of claim 17, wherein the update is embedded within the content.

* * * * *